July 20, 1926.                                              1,592,910
                       J. C. STEWART
                         CAMERA
                   Filed Sept. 22, 1924
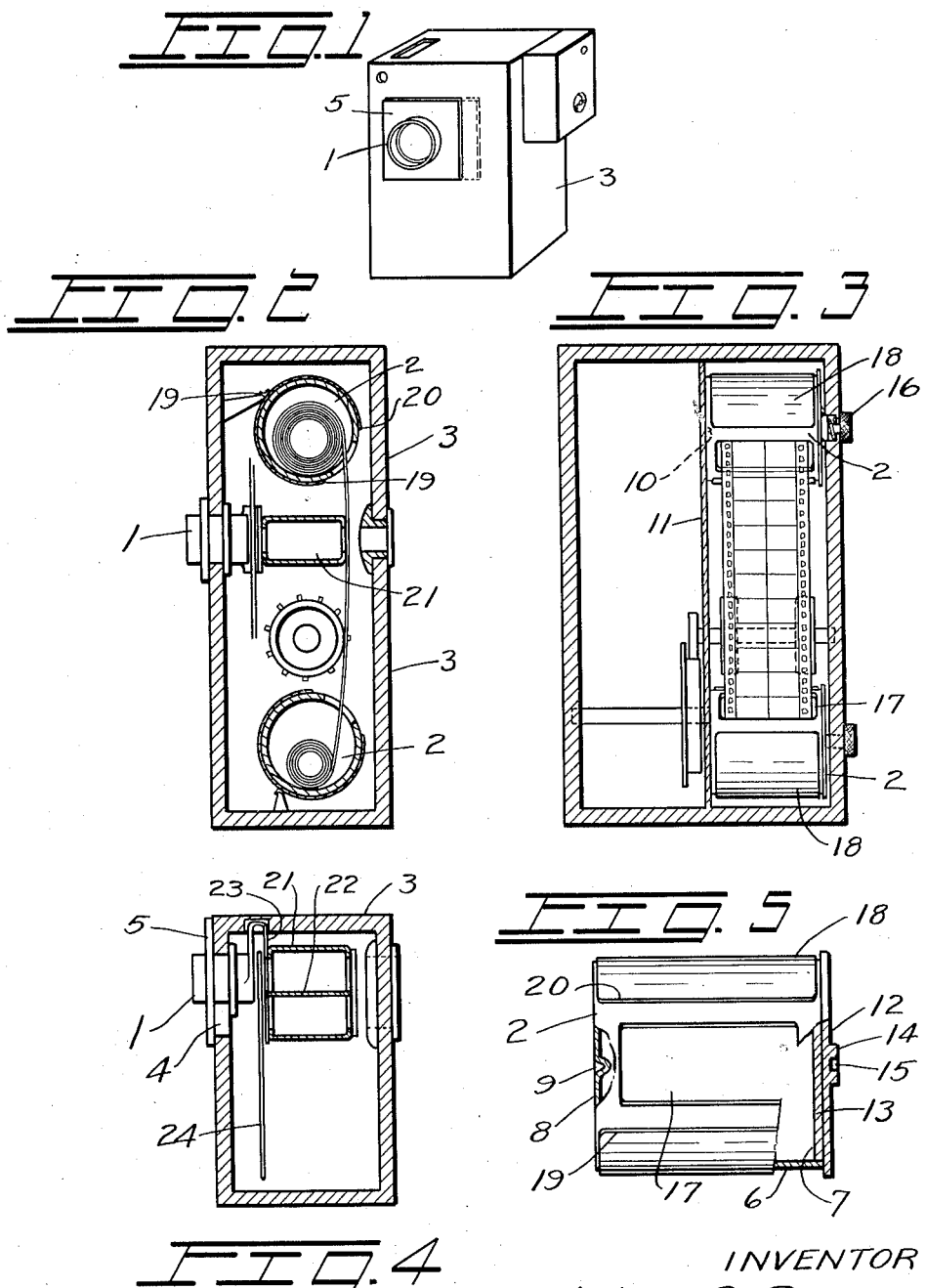
INVENTOR
John C. Stewart
Harry Bowen
ATTORNEY Patented July 20, 1926.

1,592,910

UNITED STATES PATENT OFFICE.

JOHN C. STEWART, OF SEATTLE, WASHINGTON.

CAMERA.

Application filed September 22, 1924. Serial No. 739,009.

The invention is a camera for exposing or projecting continuous film in which the lens may be moved laterally so that two rolls of pictures may be taken on the same film, and which also provides a container for short length film which may readily be inserted in or removed from the camera.

One object of the invention is to provide a camera for taking short lengths of continuous film in which two rolls of pictures may be taken on the same film.

Another object of the invention is to provide a camera with a film container that may readily be removed and replaced in order to change the film.

Another object of the invention is to provide a simple and economical film container for cameras in which a short length of film is used.

Another object of the invention is to provide a film container for short length film in which the film may readily be removed and replaced.

And a still further object of the invention is to provide a camera for short lengths of continuous film in which the lens may be moved laterally.

With these ends in view the invention embodies a camera having means for operating continuous film, a laterally movable lens, and suitable containers in which the film may be readily removed and replaced and which may be readily removed and replaced in the camera.

Other features and advantages of the invention will be seen from the following description taken in connection with the drawings, wherein:—

Figure 1 is a perspective view of the camera.

Figure 2 is a vertical section through the camera at about the center line of the film.

Figure 3 is a rear view of the camera with the back removed.

Figure 4 is a section plan at about the center line of the lens.

Figure 5 is a view showing the film container.

In the drawings I have shown my camera as it would be constructed wherein numeral 1 indicates the lens, numeral 2 the container and numeral 3 the frame.

The lens 1 which may be of any suitable type is mounted in a slotted hole 4 in the frame 3 and provided with a flange 5 which will completely cover the hole in all positions.

The container 2 is constructed with a cylindrical shell 6 having one end 7 open and the other end 8 closed. The closed end 8 is provided with a recess 9 into which a pin 10 on the partition 11 may project to hold the inner end of the container. The closed end 8 is provided with a cap 12 having an intersection 13 to fit into the end of the container and a lug 14, having a slot 15 in it into which a spring key 16 in the frame may project to rotate the container. The wall of the container 6 is provided with an opening 17 through which the film will pass. A thin metallic cover 18 with a lip 19 on it as shown in Figure 2 is placed over the container as shown and it will be seen that this cover may be moved around the container or the container moved in the cover to cover the opening 17 when it is desired to close the container. The cover extends from a point 19 to a point 20 so that there will be an opening between the ends that is somewhat larger than the opening 17. This cover may be made of any suitable spring material so that it will grip the outer surface of the container.

The frame 3 may be of any suitable design and the parts may be arranged in it in any suitable manner. The magazine 21 between the film and the lens is provided with a partition 22 as shown in Figure 4 so that when the lens is in the position shown a picture may be taken on one side of the film through one half of the magazine and when the lens is moved to the opposite end of the opening 4 the picture will be taken on the other half of the film through the opposite section of the magazine. The inner end of the lens is provided with a closure 23 as shown in Figure 4 which will close one section of the magazine 21 while the picture is being taken through the opposite section. It will be seen that this closure passes around the shutter 24 so that it will be possible to close either section of the magazine at the proper time.

It will be understood that other changes may be made in the construction without departing from the spirit of the invention. One of which changes may be in the means for supporting or holding the lens or for moving it laterally. Another may be in the design of the magazine or in the means for opening and closing the sections of it and still another may be in the means for holding or operating the film.

The construction will be readily understood from the foregoing description. To use the device it may be assembled as shown and with the lens in the position shown the film may be moved from one spool to the other by any suitable mechanism, and then by reversing the direction of the film and moving the lens to the opposite end of the opening 4 the film may be moved back to the original container so that both sides of it will be exposed. It will then be seen that the film may be removed and replaced by removing the containers similar to ordinary kodak films.

The double row of exposures on a single roll of film which may be supplied in lengths of about three and one half feet will provide the operator with two loads or the equivalent of seven feet of standard film, and as this may be taken in both the forward and backward movements, it also provides a film for projection that never requires rewinding. This short length of film also reduces the mechanism necessary to operate the camera or project it from one-half to two-thirds of that normally required by cameras or projectors for long lengths of film; and it also provides a considerably more economical apparatus as the negative and positive film cost but a few cents and the cost of developing and printing would be the same as for kodak film. This short length of film also makes it possible to load the camera or projector in three to five seconds which is about ten times the speed of any other apparatus for a similar purpose; and the film is also inexpensive as it will only require about three and one-half feet to provide two rows of pictures, each of which would be equivalent to seven feet or the two equal to fourteen feet.

Having thus fully described the invention, what I claim as new and desire to secure by Letters Patent, is:—

1. In a camera, a lens, a shutter, a double magazine co-operating with the said lens, a closure for one section of the magazine, also co-operating with the said lens, a continuous film of standard width adjacent said double magazine, and a suitable intermittent motion for operating said film and shutter, the ends of said film being rolled freely and adaptable to be rolled in either direction.

2. In a camera, a lens, a shutter, a double magazine cooperating with the said lens, a closure, means for operating the said closure with the said lens to close one section of the magazine while the lens is operating through the other section, a continuous film of standard width adjacent said double magazine, a suitable intermittent motion for operating said film and shutter, means for adjusting the said motion to reverse the direction of the film, and means for holding the said film on each side of the said magazine, the ends of the said film being rolled freely into the said holding means and adaptable to be rolled in either direction.

3. In a camera, a lens, a shutter, a double magazine cooperating with the said lens, a closure, means for operating the said closure with the said lens to close one section of the magazine while the lens is operating through the other section to take two rows of pictures on a film, a continuous film of standard width adjacent said double magazine, a suitable intermittent motion for operating the said film and shutter, means for reversing the direction of the film through the motion, holders for the said film, one of said holders being removable, and means for closing the said removable holder from the exterior of the camera, the ends of the said film being rolled freely into the said holders and adaptable to roll in either direction.

JOHN C. STEWART.